(12) United States Patent
Kametani

(10) Patent No.: US 6,839,346 B1
(45) Date of Patent: Jan. 4, 2005

(54) PACKET SWITCHING APPARATUS WITH HIGH SPEED ROUTING FUNCTION

(75) Inventor: Jun Kametani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/532,585

(22) Filed: Mar. 22, 2000

(30) Foreign Application Priority Data

Apr. 5, 1999 (JP) .......................................... 11/098140

(51) Int. Cl.[7] .............................................. H04L 12/56
(52) U.S. Cl. ............... 370/389; 370/395.31; 370/395.32
(58) Field of Search ................................. 370/389, 218, 370/250, 401, 352, 355, 356, 397, 395.31, 395.52, 447, 474, 427, 451, 432, 461, 462, 471, 902, 353, 392; 380/44, 266

(56) References Cited

U.S. PATENT DOCUMENTS

| | | | | |
|---|---|---|---|---|
| 5,915,025 A | * | 6/1999 | Taguchi et al. | 380/44 |
| 6,009,102 A | * | 12/1999 | Horikawa et al. | 370/401 |
| 6,032,190 A | * | 2/2000 | Bremer et al. | 709/238 |
| 6,223,172 B1 | * | 4/2001 | Hunter et al. | 707/202 |
| 6,295,604 B1 | * | 9/2001 | Callum | 713/160 |
| 6,510,159 B1 | * | 1/2003 | Noriyuki | 370/401 |
| 6,633,571 B1 | * | 10/2003 | Sakamoto et al. | 370/401 |
| 6,665,297 B1 | * | 12/2003 | Hariguchi et al. | 370/392 |

FOREIGN PATENT DOCUMENTS

JP 1-152831 6/1989
JP 9-149023 6/1997

OTHER PUBLICATIONS

Watanabe, Akira et al., "Realization Method of Secure Communication Grups Using Encryption and ITS Implementation," Information Processing Society of Japan, Apr. 1997, No. 4.

Yamano, Shigeki et al., "Scalable QOS Guaranteed VPN Scheme Based on MPOA," Technical Report of IEICE, (1999).

Japanese Office Action dated May 10, 2002 with partial English translation.

* cited by examiner

Primary Examiner—Chi Pham
Assistant Examiner—Alexander O. Boakye
(74) Attorney, Agent, or Firm—Dickstein, Shapiro, Morin & Oshinsky, LLP.

(57) ABSTRACT

A packet switching apparatus includes a plurality of lower layer processing units, a table, and a processing unit. Each of the plurality of lower layer processing units carries out a process for a data link layer and a physical layer to a packet. The table stores flow data which includes a routing data and a search key. The processing unit searches the flow data from the table based on a search key of a routing packet received via one of the plurality of lower layer processing units, when the flow data for the search key of the routing packet is registered on the table. Also, the processing unit selectively transfers the routing packet to one of the plurality of lower layer processing units based on the routing data of the searched flow data.

31 Claims, 9 Drawing Sheets

Fig. 3

| SEARCH KEY | | ROUTING RESULT | | | SECURITY DATA | | | |
|---|---|---|---|---|---|---|---|---|
| IP SOURCE ADDRESS | IP DESTINATION ADDRESS | MAC SOURCE ADDRESS | MAC DESTINATION ADDRESS | OUTPUT PORT NO. | ENCRYPTION ALGORITHM | ENCRYPTION KEY | NEW IP SOURCE ADDRESS | NEW IP DESTINATION ADDRESS |
| AA BB CC DD | EE FF GG HH | 123456 | 789012 | 2 | | | | |
| AA BB CC DD | KK LL MM NN | | | 9 | DES-CBC | XXXXXX | AA BB CC XX | KK LL MM YY |
| AA BB CC XX | KK LL MM YY | 123456 | 789012 | 2 | | | | |
| KK LL MM YY | AA BB CC XX | | | 9 | DES-CBC | YYYYYY | | |
| ... | ... | ... | ... | ... | ... | ... | ... | ... |

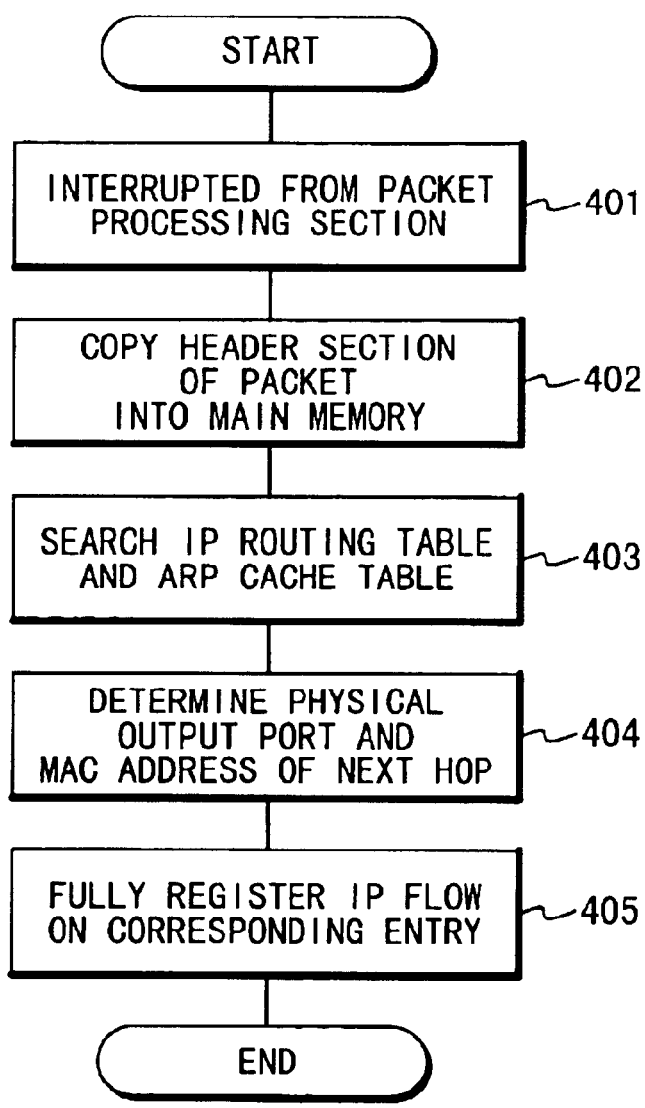

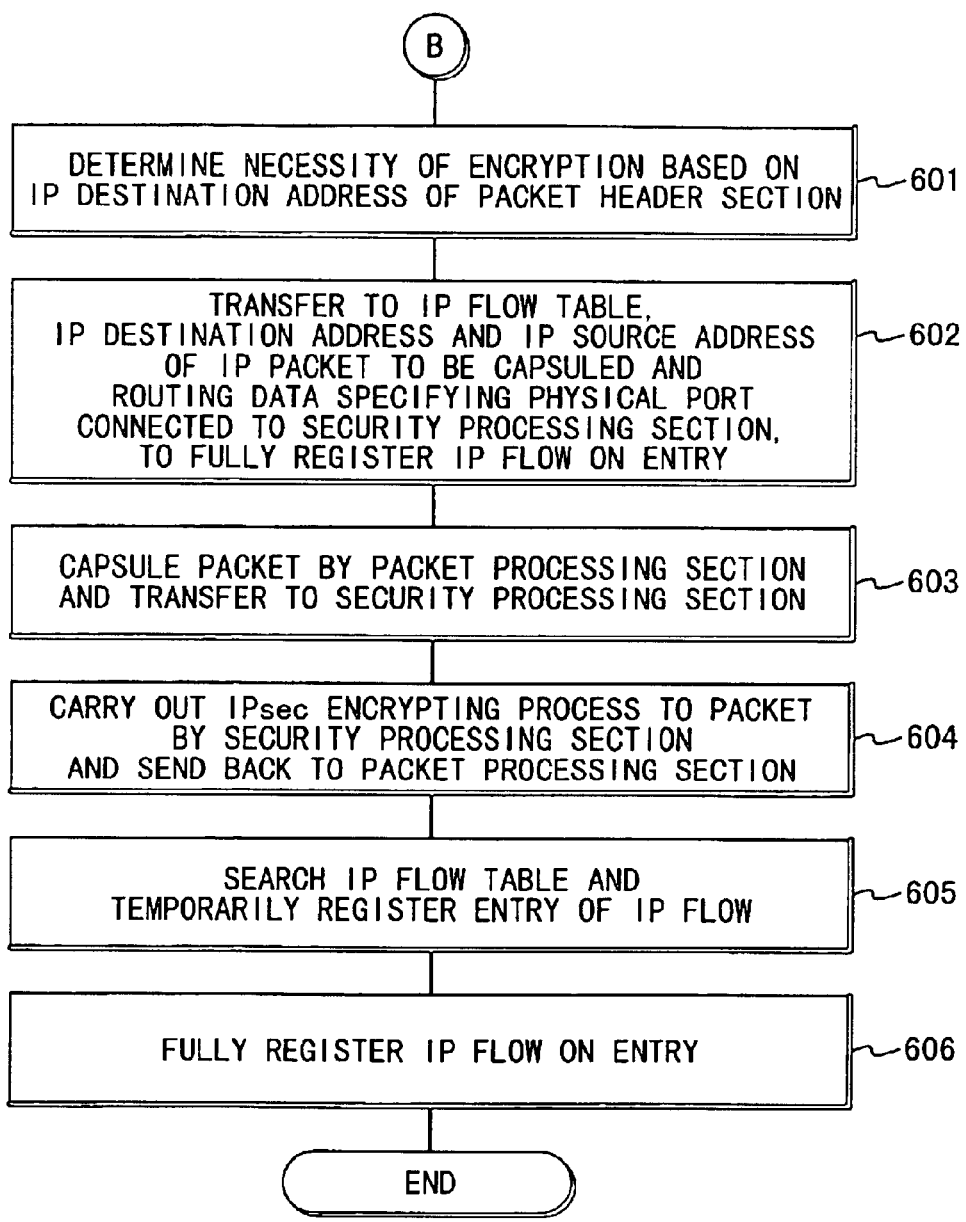

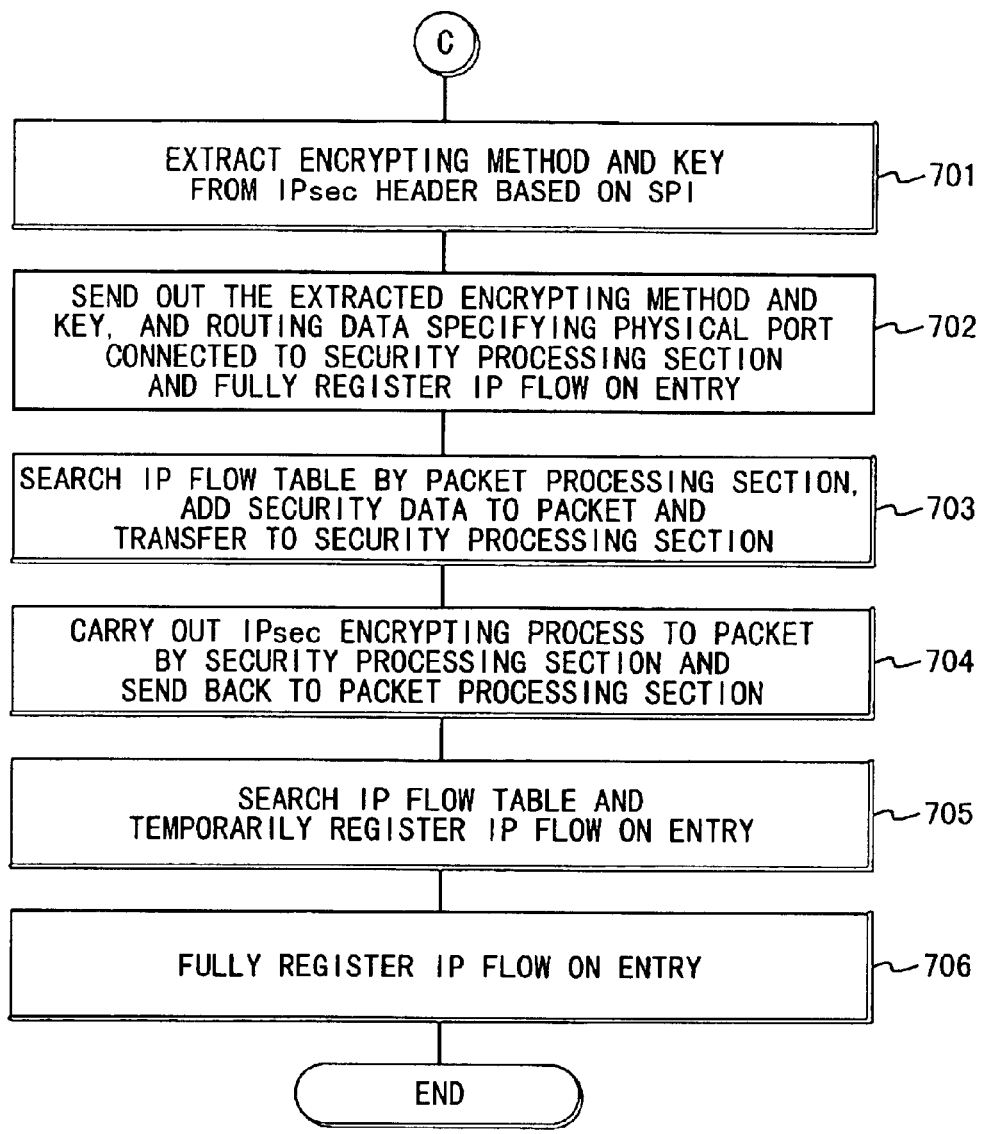

PACKET SWITCHING APPARATUS WITH HIGH SPEED ROUTING FUNCTION

BACKGROUND OF THE INVENTION

1. Field of the Invention

The present invention relates to a packet communication network, and more particularly to a packet switching apparatus used in a packet communication network.

2. Description of the Related Art

In a packet communication network which is represented by the Internet, the transmission of data is carried out in a packet unit. The packet contains the header which contains a source address and a destination address of the packet data. A packet switching apparatus such as a router transfers the packet to an appropriate network in the packet unit based on the destination address of the header. Thus, the packet routing process is conventionally carried out in the packet unit. In this way, the packet routing process is generally carried out as a software based process.

FIG. 1 shows a block diagram showing the structure of a conventional example of the packet switching apparatus for carrying out the packet routing process. Referring to FIG. 1, the packet switching apparatus is composed of a microprocessor 101, a main memory 102, a packet memory 105, lower layer processing sections 110 and a DMA controller 112. The main memory 102 stores a software program executed on the microprocessor 101 and routing data. The packet memory 105 stores received packets. Each of the lower layer processing sections 110 has the hardware structure which executes the processes for a data link layer and a physical layer. The DMA controller 112 transfers the packet between the lower layer processing section 110 and the a packet memory 105.

In a conventional router which has the structure shown in FIG. 1, when a packet is received by one of the lower layer processing sections 110, the DMA controller 112 transfers the received packet from the lower layer processing section 110 to the packet memory 105 once. After this, the microprocessor 101 copies the packet stored in the packet memory 105 in the main memory 102 via a processor bus 103. After that, a routing process is carried out by the microprocessor 101 under the software control. A packet whose header is replaced with a MAC (media access control) header is again copied into the packet memory 105. Next, the DMA controller 112 transfers the packet to one of the lower layer processing sections 110 based on the destination address of the packet. The lower layer processing section 110 is connected with a physical output port. The lower layer processing section 110 transmits the transferred packet to a network via the physical output port after processing of the lower layer processing section 110.

As described above, in the conventional example of the packet switching apparatus, the routing process to all packets is carried out by the microprocessor 101 under the software control. Therefore, the network speed depends on the performance of the microprocessor 101 itself.

As for the packet communication system, it is conventionally pointed out that the security of data is weak, compared with a line switching system. Also, with the rapid spread of use of the Internet in recent years, the data security in the packet communication is an urgent problem. For this reasons, the system for encrypting IP (Internet protocol) packet data or IPsec is standardized as the security measure in the network layer.

In the conventional packet switching apparatus, the processes including the process of encrypting and decrypting of a packet based on IPsec are all carried out by the microprocessor 101. Therefore, the increase of the communication traffic and the increase of the network speed are limited due to the performance of the microprocessor.

In the packet switching apparatus shown in FIG. 1, if the packet memory 105 and the main memory 102 are formed in a same memory device as a unit, the time necessary for the data transfer between the memories can be reduced. However, because all the processes for every packet still are the load of the microprocessor, there is remained the problem that there is the limit due to the performance of the microprocessor to increase of processing speed.

Also, the process of encrypting and decrypting the packet based on the above-mentioned IPsec is sometimes executed in the conventional packet switching apparatus to improve security of the packet communication. In this case, because a part of the ability of the microprocessor is used for the encrypting and decrypting process of the packet, the overall processing efficiency of the packet switching apparatus is decreased and there is the limit in high processing speed. More specifically, when the IPsec processing is newly added to the above conventional packet switching apparatus, the data throughput of the packet sometimes fell to about 1/10.

In conjunction with the above description, an encryption communication processing apparatus is disclosed in Japanese Laid Open Patent Application (JP-A-Heisei 1-152831). In this reference, an encrypted sentence is communicated between terminals connected to a branch type (bus type) network. In this case, an access control circuit carries out the identification and management of an address of the terminal and an encryption token. A mode control circuit sets an encrypt mode when an encrypted sentence is identified by the access control circuit. Thus, the reference solves the problem that a common address is received by a terminal other than target terminals because of an error when an encrypted sentence is broadcast using the common address.

Also, an information communication processing apparatus is in Japanese Laid Open Patent Application (JP-A-Heisei 9-149023). In this reference, a plurality of encrypting/decrypting methods are stored in each of tables (11 and 21). A selecting section (13) in a unit (1) selects one of the plurality of encrypting/decrypting methods stored in the table (11). A control section (14) notifies an offset value of the selected encrypting/decrypting method in the table to a control section (24) in a unit (2). Thus, the information communication processing apparatus is provided in which there is less possibility of leakage of secret.

SUMMARY OF THE INVENTION

Therefore, an object of the present invention is to provide a packet switching apparatus which the load of a microprocessor can be reduced.

Another object of the present invention is to provide a packet switching apparatus in which a high speed packet switching process can be attained.

Still another object of the present invention is to provide a packet switching apparatus which the loads of a routing process and security process on a microprocessor can be reduced.

In order to achieve an aspect of the present invention, a packet switching apparatus includes a plurality of lower layer processing units, a table, and a processing unit. The plurality of lower layer processing units are connected to physical output ports, and each of the lower layer processing units carries out a process for a data link layer and a physical layer to a packet. The table stores flow data including a routing data and a search key. The processing unit searches the flow data from the table based on a search key of a routing packet received via one of the plurality of lower layer processing units, when the flow data for the search key of the routing packet is registered on the table, and selectively transfers the routing packet to one of the plurality of lower layer processing units based on the routing data of the searched flow data.

The packet switching apparatus may further include a packet memory. Also, the processing unit stores the received packet in the packet memory, and extracts the search key from the stored packet.

Also, the packet switching apparatus may further include a processor carrying out a routing process of the routing packet in response to a routing process request to output the routing data. In this case, the processing unit generates the routing process request to the processor, when the flow data for the search key of the routing packet is not registered on the table, and registers the routing data as a part of the flow data for the search key on the table such that the flow data is fully registered, when the routing data is outputted from the processor. Here, the processing unit may store the search key of the routing packet in the table, when the flow data for the search key of the routing packet is not registered on the table.

Also, when the routing data includes a port number specifying a physical output port, the processing unit may select one of the plurality of lower layer processing units based on the port number of the routing data of the flow data for the search key of the routing packet, and may transfer the routing packet to the selected lower layer processing section.

Also, when the routing data includes a port number specifying a physical output port, the packet switching apparatus further includes a switch fabric connecting between the processing unit and the plurality of lower layer processing units, having an arbitration function and addressing the routing packet to the lower layer processing unit based on the port number.

In order to achieve another object of the present invention, a packet switching apparatus includes a plurality of lower layer processing units, a security unit, a table and a processing unit. The plurality of lower layer processing units are connected to physical output ports, and each of the lower layer processing units carries out a process for a data link layer and a physical layer to a packet. The security unit carries out encrypting and decrypting processes to a first packet based on a specific security data in response to encrypt and decrypt instructions to produce a second packet, respectively. The table stores flow data including a search key, routing data and security data. The processing unit searches a flow data from the table based on a search key of a routing packet received via one of the plurality of lower layer processing units in the packet memory, when the flow data for the search key of the routing packet is registered on the table and the flow data includes the security data, the search key including a destination address. Also, the processing unit transfers the security data of the searched flow data as the specific security data, the routing packet as the first packet, and one of the encrypt and decrypt instructions to the security unit, searches another flow data from the table based on a search key of the second packet from the security unit as a routing packet, when the another flow data is registered on the table, and selectively transfers the second packet to one of the plurality of lower layer processing units based on the routing data of the searched another flow data.

Here, the processing unit may generate one of the encrypt and decrypt instructions based on the destination address, when the flow data for the search key of the routing packet is registered on the table and the flow data includes the security data.

Also, the when the flow data for the search key of the routing packet received via the lower layer processing unit is registered on the table and the flow data does not includes the security data, the processing unit handles the received routing packet as the second packet to search another flow data from the table based on a search key of the second packet.

Also, the packet switching apparatus may further includes a processor carrying out a security process for the routing packet in response to a security process request to output the security data for the routing packet. At this time, the processing unit selectively generates the security process request to the processor based on the destination address, when the flow data for the search key of the routing packet is not registered on the table, and registers the security data as a part of the flow data for the search key of the routing packet on the table such that the flow data is fully registered, when the security data is outputted from the processor. In this case, the processing unit may store the search key of the routing packet in the table, when the flow data for the search key of the routing packet is not registered on the table.

Also, the packet switching apparatus may further include a processor carrying out a routing process of the routing packet in response to a routing process request to output the routing data. At this time, the processing unit generates the routing process request to the processor, when the flow data for the search key of the routing packet is not registered on the table, and registers the routing data as a part of the flow data for the search key on the table such that the flow data is fully registered, when the routing data is outputted from the processor. In this case, the processing unit may store the search key of the routing packet in the table, when the flow data for the search key of the routing packet is not registered on the table.

When the routing data includes a port number specifying a physical output port, the processing unit may select one of the plurality of lower layer processing units based on the port number of the routing data of the flow data for the search key of the routing packet, and transfers the second packet the selected lower layer processing section.

Also, when the routing data includes a port number specifying a physical output port, the packet switching apparatus may further include a switch fabric connecting between the processing unit, the security unit and the plurality of lower layer processing units, having an arbitration function and addressing the second packet to the lower layer processing unit based on the port number.

In order to achieve still another aspect of the present invention, a packet switching apparatus includes a plurality of lower layer processing units, a security unit, a table and a processing unit. The plurality of lower layer processing units are connected to physical output ports, and each of the lower layer processing units carries out a process for a data link layer and a physical layer to a packet. The security unit carries out encrypting and decrypting processes to a first packet based on a specific security data in response to encrypt and decrypt instructions to produce a second packet, respectively, and selectively transfers the second packet to one of the plurality of lower layer processing units based on the routing data. The table stores flow data including a search key, routing data and security data. The processing unit searches a flow data from the table based on a search key of a routing packet received via one of the plurality of lower layer processing units in the packet memory, when the flow data for the search key of the routing packet is registered on the table and the flow data includes the security data, the search key including a destination address, transfers the security data of the searched flow data as the specific security data, the routing packet as the first packet, and one of the encrypt and decrypt instructions to the security unit together with the routing data.

Here, the processing unit may generate one of the encrypt and decrypt instructions based on the destination address, when the flow data for the search key of the routing packet is registered on the table and the flow data includes the security data.

Also, when the flow data for the search key of the routing packet received via the lower layer processing unit is registered on the table and the flow data does not includes the security data, the processing unit may selectively transfer the second packet to one of the plurality of lower layer processing units based on the routing data of the searched flow data.

Also, the packet switching apparatus may further include a processor carrying out a routing process of the routing packet in response to a process request to output the routing data, and selectively carrying out a security process for the routing packet based on the destination address of the routing packet in response to the process request to output the security data for the routing packet. At this time, the processing unit may generate the process request to the processor, when the flow data for the search key of the routing packet is not registered on the table, and register the routing data and the security data from the processor as a part of the flow data for the search key of the routing packet on the table such that the flow data is fully registered. In this case, the processing unit may store the search key of the routing packet in the table, when the flow data for the search key of the routing packet is not registered on the table. Also, when the flow data for the search key of the routing packet is not registered on the table, the processing unit may output the routing data and the security data as the specific security data from the processor, the routing packet as the first packet, and one of the encrypt and decrypt instructions to the security unit.

Also, when the routing data includes a port number specifying a physical output port, the security unit may select one of the plurality of lower layer processing units based on the port number of the routing data of the flow data for the search key of the routing packet, and transfer the transmission packet the selected lower layer processing section.

Also, when the routing data includes a port number specifying a physical output port, the packet switching apparatus may further include a switch fabric connecting between the processing unit, the security unit and the plurality of lower layer processing units, having an arbitration function and addressing the second packet to the lower layer processing unit based on the port number.

In order to achieve yet still another aspect of the present invention, a method of switching a routing packet is attained by searching a table for a flow data based on a search key of a routing packet, the flow data including a routing data and the search key; and by transferring the routing packet to a physical output port determined based on a destination address of the routing packet, when the flow data for the search key of the routing packet is registered on the table.

In this case, the method may further include:

registering the search key on the table when the flow data for the search key of the routing packet is not registered on the table;

carrying out the routing process of the routing packet, when the flow data for the search key of the routing packet is not registered on the table; and registering the routing data as a part of the flow data for the search key on the table such that the flow data is fully registered.

Also, it is an object of the present invention to provide a method of switching a routing packet. The method is attained by searching a table for a flow data based on a search key of a routing packet, the flow data including the search key, routing data and security data, and the search key including a destination address, by selectively generating one of the encrypt and decrypt instructions based on the destination address, by carrying out one of an encrypting process or a decrypting processes to the routing packet based on the security data in response to the generated instruction, when the flow data for the search key of the routing packet is registered on the table and the flow data includes the security data, to produce another routing packet, and by outputting the another routing packet as a transmission packet to a physical output port.

Here, the method may further include:

outputting the transmission packet to a physical output port based on the searched routing data.

Also, the method may further include: searching the table for a flow data based on a search key of the transmission packet; and transferring the transmission packet to a physical output port determined based on a destination address of the transmission packet when the flow data for the search key of the routing packet is registered on the table.

Also, the method may further include:

when the flow data for the search key of the routing packet is registered on the table and the flow data does not includes the security data, selectively transferring the transmission packet to the physical output port based on the routing data of the searched flow data.

Also, the method may further include:

generating a process request, when the flow data for the search key of the routing packet is not registered on the table;

carrying out a routing process of the routing packet in response to the process request to output the routing data;

selectively carrying out a security process for the routing packet based on the destination address of the routing packet in response to the process request to output the security data for the routing packet; and registering the routing data and the security data as a part of the flow data for the search key of the routing packet such that the flow data is fully registered. In this case, the registering may includes:

registering the search key of the routing packet in the table, when the flow data for the search key of the routing packet is not registered on the table.

BRIEF DESCRIPTION OF THE DRAWINGS

FIG. 3 is a diagram showing an example of an IP flow table in the packet switching apparatus of the first embodiment;

FIG. 5 is a flow chart showing a flow of a routing process in the packet switching apparatus of the first embodiment;

FIGS. 6A to 6C are flow charts showing a flow of a packet process containing a security process in the packet switching apparatus of the second embodiment.

DESCRIPTION OF THE PREFERRED EMBODIMENTS

Hereinafter, a packet communication system using a packet switching apparatus of the present invention will be described below in detail with reference to the attached drawings.

Figure 1:
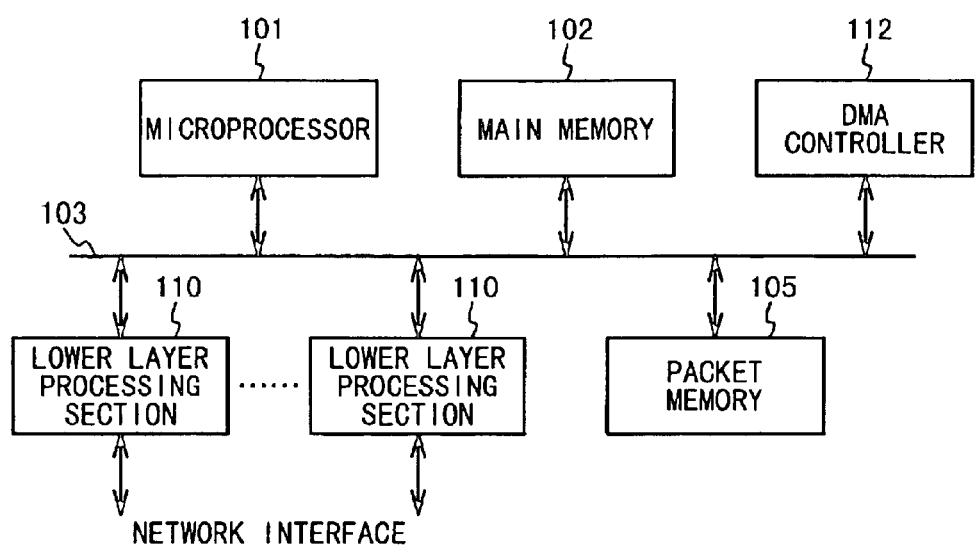
FIG. 1 is a block diagram showing the structure of a conventional packet switching apparatus.
Figure 2:
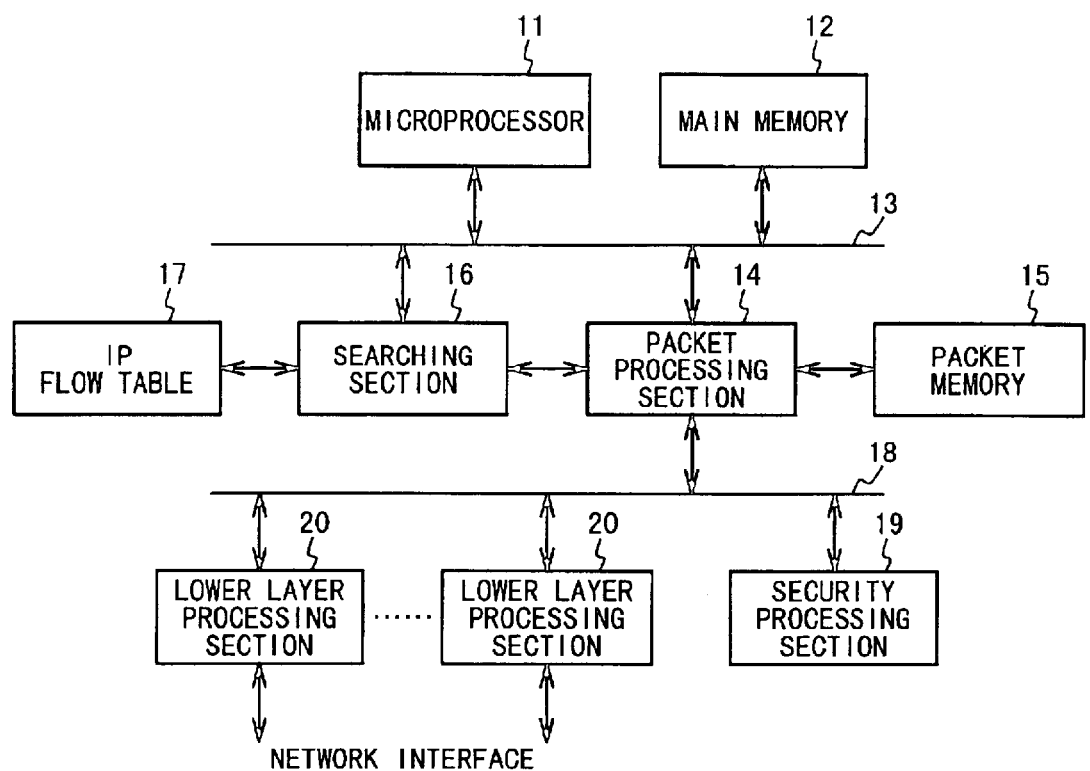
FIG. 2 is a block diagram showing the structure of a packet switching apparatus according to a first embodiment of the present invention.

FIG. 2 is a block diagram showing the structure of the packet switching apparatus according to the first embodiment of the present invention. Referring to FIG. 2, the packet switching apparatus in the first embodiment is composed of a microprocessor 11, a main memory 12, a processor bus 13, a packet processing section 14, a packet memory 15, a search processing section 16, an IP flow table 17, a switch fabric 18, a security processing section 19 and lower layer processing sections 20. It should be noted that only the structure part which relates to the present invention is shown in FIG. 2 and the other general structure part is omitted.

In the above structure part, the microprocessor 11 executes a software program stored in the main memory 12 to control the whole packet switching apparatus. The microprocessor 11 carries out a routing process to determine the destination of a received packet. Also, the microprocessor 11 determines the necessity of the encrypting or decrypting process of the received packet and generates an encrypt instruction or a decrypt instruction. The main memory 12 stores the software program for controlling the microprocessor 11 and various kinds of data related to predetermined processes.

The packet processing section 14 carries out processes such as an IP header process and a transfer process to the packet received via a network interface to the output network interface. In this case, the IP header process contains various processes. In the IP header process, for example, an IP destination address and an IP source address are extracted from the header added to the received packet. Also, a new MAC header is generated in accordance with a MAC address which is determined through the routing process by the microprocessor 11. The packet processing section 14 also generates a search instruction based on a search key which is extracted from the packet header, to control the search processing section 16. The search key is composed of the IP destination address and/or an IP source address. The packet processing section 14 also carries out the IP header process based on a physical output port and MAC address which are acquired from the IP flow table 17 by the search processing section 16 in response to the search instruction.

The packet memory 15 temporarily stores the received packet for the processing by the microprocessor 11 and the packet processing section 14. Also, the packet memory 15 functions as a processor processing queue in which the received packets are registered for the routing process by the microprocessor 11.

The search processing section 16 searches the IP flow table 17 in response to the search instruction from the packet processing section 14 and replies the registered result of a routing process of the packet to the packet processing section 14. Also, when the IP flow corresponding to the search instruction from the packet processing section 14 does not exist in the IP flow table 17, the search processing section 16 carries out the temporary registration of the IP flow to the IP flow table, that is, registers the IP source address and the IP destination address as an entry of the IP flow. Moreover, the search processing section 16 receives the result of the routing process by the microprocessor 11, and stores the received routing process result in the temporarily registered IP flow of the IP flow table 17 to fully register the IP flow.

The IP flow table 17 is a table for storing the IP flow as a result of the routing process by the microprocessor 11, using an IP source address and an IP destination address as a search key. FIG. 3 shows an example of IP flow table 17. Referring to FIG. 3, the IP flow is composed of a search key, a routing result and security data. The search key is composed of the IP source address and the IP destination address. The routing result is composed of a MAC source address, a MAC destination address, and a port number of a physical output port which are obtained as a result of the routing process. Also, the security data is composed of encryption algorithm, an encryption key, a new IP source address, and a new IP destination address.

The switch fabric 18 mutually connects between the plurality of lower layer processing sections 20 which are respectively connected with a plurality of network interfaces, the packet processing section 14 and the security processing section 19. The switch fabric 18 may be any kind of circuit if the circuit have an arbitration function and an addressing function in the data transfer between the connected sections. The switch fabric 18 may be a simple tri-state bus, a ring bus, or a crossbar switch. Also, the switch fabric 18 may be formed to have a token ring bus structure.

The security processing section 19 carries out an encrypting process and a decrypting process for every packet in response to an encrypt instruction and an decrypt instruction, respectively.

Each of the lower layer processing sections 20 is connected with a physical network interface, to carry out the processing for a data link layer (the second layer of the OSI7 layer model) and a physical layer as a lower layer. Also, the lower layer processing section 20 carries out the transmission and reception of the packet between the packet processing sections 14 and it through the switch fabric 18.

The packet switching apparatus in the first embodiment may be attained by various circuits which realize the functions of the above components, e.g., may be attained as a semiconductor integrated circuit which includes the above components.

Next, the operation of the packet switching apparatus in the first embodiment will be described below in detail.

Figure 4:
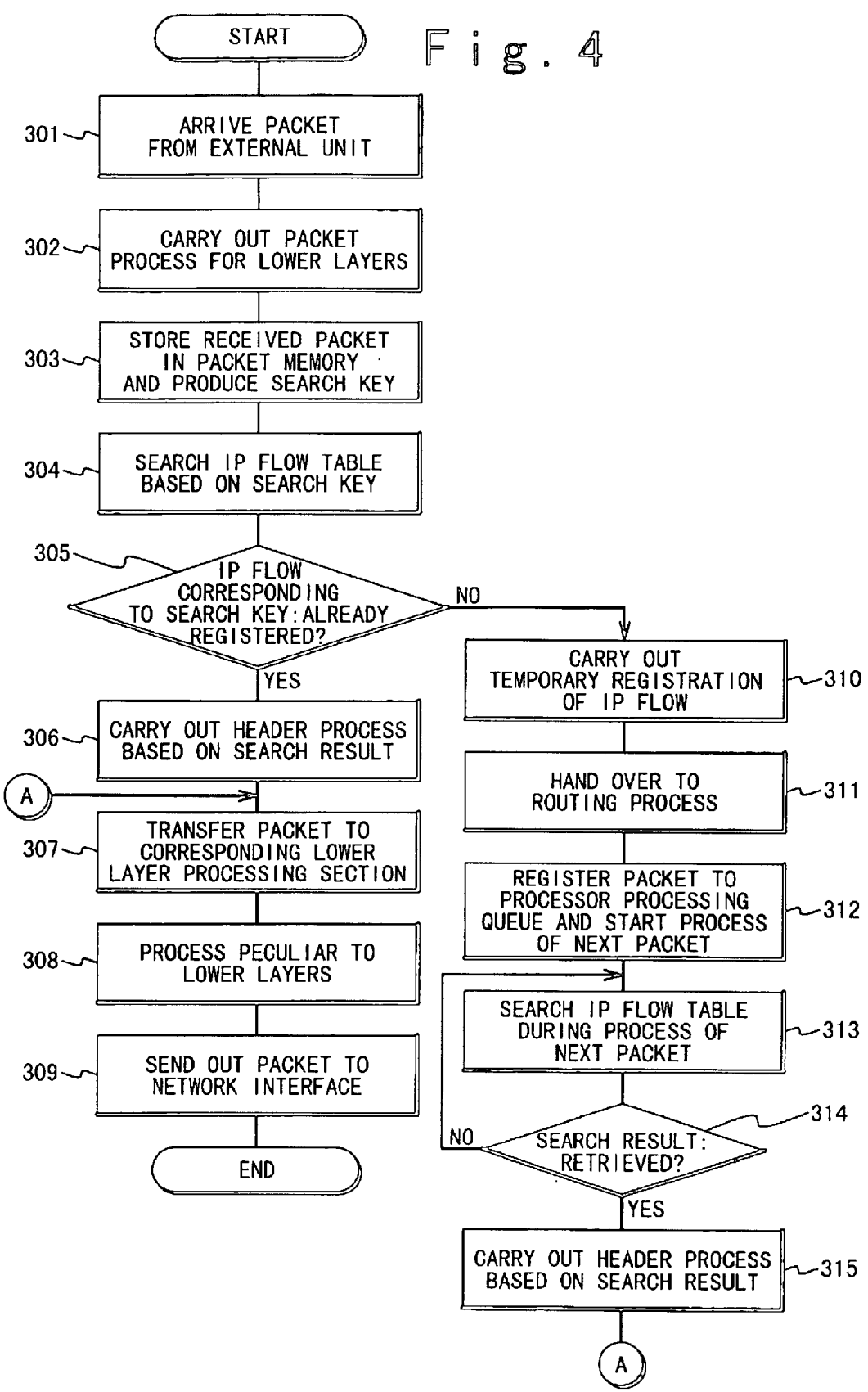
FIG. 4 is a flow chart showing a main flow of a packet process in the packet switching apparatus of the first embodiment.

FIG. 4 is a flow chart showing a main flow of a packet process in the first embodiment. FIG. 5 is a flow chart showing a flow of the routing process by the microprocessor 11.

The packet switching apparatus of the first embodiment carries out the process of a network layer of the packet communication which is represented by the Internet. Therefore, the header of a packet received from a network interface is analyzed and the routing process is carried out based on an IP destination address. The packet subjected to the routing process is transferred to a network interface on the output side in accordance with the analyzing result.

Referring to FIG. 4, first, an IP packet arrives at one of the lower layer processing sections 20 which is connected with an external network via a network interface (Step 301). The lower layer processing section 20 carries out the packet process for the data link layer as layer 2 and the physical layer as layer 1. The packet process includes a synchronous establishing process, a verifying process of a lower layer header such as a MAC header, and a calculating process of CRC (Step 302). When the process for the lower layers is completed, the lower layer processing section 20 transfers the received packet to the packet processing section 14 via the switch fabric 18.

The packet processing section 14 receives the transferred reception packet, and stores in the packet memory 15. After that, the packet processing section 14 extracts an IP destination address and an IP source address from the packet header of the stored packet. Then, the packet processing section 14 generates a search instruction in response to the extraction of the extracted IP destination address and IP source address as a search key. The search key is used for a searching operation to the IP flow table 17 (Step 303). Next, the packet processing section 14 sends out the search key and the search instruction to the search processing section 16.

The search processing section 16 carries out the searching operation of the IP flow table 17 using the search key received from the packet processing section 14. The search processing section 16 notifies the search result to the packet processing section 14 (Step 304). As the result of the searching operation by the search processing section 16, it is supposed that the IP flow corresponding to the search key is registered on the IP flow table 17. That is, it is supposed that the microprocessor 11 has already carried out the routing process to a packet having the same type, source address and destination address as the received packet. In this case, the packet processing section 14 receives the search result from the search processing section 16. In case of the IP flow table 17 shown in FIG. 3, the packet processing section 14 receives a MAC source address, a MAC destination address, and a port number of a physical output port as the search result. The packet processing section 14 carries out a header process based on the received search result (Steps 305 and 306). After that, the packet processing section 14 transfers the packet subjected to the header process, through the switch fabric 18 to the lower layer processing section 20 which is connected with the physical output port indicated by the search result (Step 307).

In this way, through the above processes, the packet can be transferred without any routing process by the microprocessor 11 under the software control.

The lower layer processing section 20 receives the packet from the packet processing section 14 and carries out the processing which is peculiar to the lower layers (Step 308). That is, the lower layer processing section 20 carries out CRC calculation of the whole packet and a process of adding a calculation result to the packet. Then, the lower layer processing section 20 sends out the packet to the connected network interface (Step 309).

On the other hand, there is a case that the IP flow corresponding to the search key is not registered on the IP flow table 17 as a result of the searching operation by the search processing section 16. In this case, the packet processing section 14 issues a register instruction to the search processing section 16 such that the search key is temporarily registered on the IP flow table 17 to reserve an entry (Steps 305 and 310). As a result, only the item of the search key exists in the IP flow table 17 shown in FIG. 3.

Next, the packet processing section 14 generates an interrupt to the microprocessor 11 and hands the packet over to the microprocessor 11 for the routing process (Step 311). At this time, the packet is registered on the processor processing queue of the packet memory 15. After that, the packet processing section 14 starts the processing of the following packet (Step 312).

After this, the packet processing section 14 checks the packets of the processor processing queue of the packet memory 15 during the packet process of the next received packet. Then, the packet processing section 14 extracts the search key of the packet which is located at the head of the queue. Also, the packet processing section 14 controls the search processing section 16 to carry out the searching operation of the IP flow table 17 (Step 313). As described later, if the routing process to the packet corresponding to the interrupt by the microprocessor 11 has completed, the IP flow for the packet is fully registered based on the routing process result. That is, a MAC source address, a MAC destination address and a port number of a physical output port are obtained as the routing process result the routing process result is sent to the searching section together with the search key. The searching section 16 searches the IP flow table 17 based on the search key and registers the routing process result on the entry of the IP flow table 17.

After that, the searching section 16 searches the IP flow table 17 based on the search key in response to a search instruction from the packet processing section 14. As a result, the IP flow containing the MAC source address, MAC destination address and the port number of a physical output port are obtained as the searching result (Step 314). The packet processing section 14 carries out the packet header process based on the obtained MAC addresses and the port number of the physical output port (Step 315). Hereinafter, the packet is transferred to the lower layer processing section 20 based on the port number and is sent out to the network interface after process peculiar to the lower layers is carried out (Steps 307, 308, 309).

After this, when a new packet having the same IP source address and IP destination address as those of the above-mentioned packet is received, the packet processing section 14 can carry out the transfer of the new packet through the process of the steps 305, 306 and 307. This is because the IP flow corresponding to the new packet is already registered on the IP flow table 17. Therefore, the packet is not subjected to the routing process by the microprocessor 11 under the software control.

Next, an operation of the microprocessor 11 when the packet is handed over to the microprocessor 11 for the routing process at the step 311 will be described below.

Referring to FIG. 5, the microprocessor 11 starts the routing process in response to the interrupt from the packet processing section 14. First, the microprocessor 11 accesses the packet memory 15 through the processor bus 13 and the packet processing section 14 (Step 401). The microprocessor 11 copies only the header section of the packet registered on the processor processing queue of the packet memory 15 into the main memory 12 (Step 402).

Next, the microprocessor 11 carries out an searching operation of an IP routing table (not shown) and an ARP cash table (not shown) which are previously stored in the main memory 12, using an IP destination address of the copied packet header section as a key (Step 403). Also, the microprocessor 11 determines the physical output port as the destination of the packet and the MAC address of the next hop (Step 404). Also, the microprocessor 11 sends out the routing process result to the IP flow table 17 through the processor bus 13 and the search processing section 16 such that the IP flow which has been temporarily registered can be fully registered (Step 405). This operation is equivalent to addition of the routing result to the IP flow table 17 shown in FIG. 4.

Figure 6A:
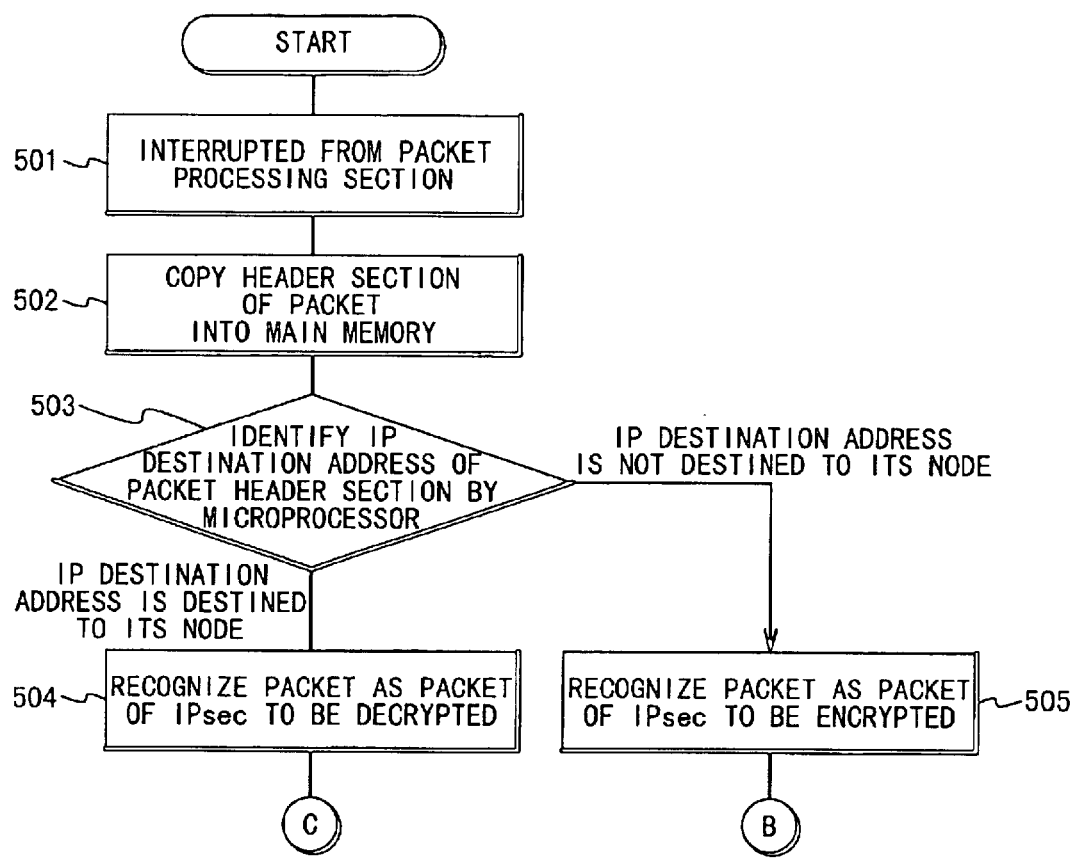

Next, the operation of the packet switching apparatus according to the second embodiment of the present invention will be described. In the second embodiment, when the received packet is subject to the routing process, the security process such as the encrypting process and the decrypting process is carried out for each of the packets based on the IP destination address and the IP source address. FIGS. 6A to 6C are flow charts showing a flow of the packet process in the second embodiment when the security process is added. The process for IPsec which is defined in IETF (Internet Engineering Task Force) will be described as an example of the security process.

When IPsec is loaded into the packet switching apparatus such as a router, an encrypting algorithm of a packet and an encryption key are previously shared between the packet switching apparatus and a packet switching apparatus for a destination of the packet. A method of encapsulating the packet as a communication packet between the packet switching apparatuses, i.e., a tunnel mode encapsulation is used. The encrypting algorithm of the packet and the encryption key are unique between communicating terminal. Therefore, the packet switching apparatus can determine the encrypting algorithm and the encryption key to be applied to the packet from the IP destination address and the IP source address. It is necessary that these sharing data are established between the packet switching apparatuses previously or depending upon necessity. In the second embodiment, the microprocessor 11 carries out all processes associated with the establishment of the sharing data under the software control.

Figure 7:
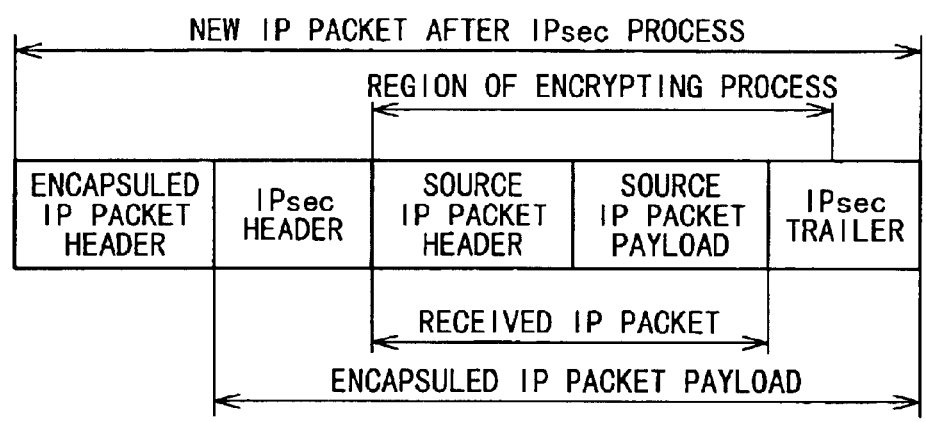
FIG. 7 is a diagram showing the structure of an IP packet processed in an IPsec tunnel mode.

FIG. 7 shows the structure of an IPsec packet, i.e., an IP packet which is processed in the IPsec tunnel mode. An IP packet received from a host in the network is composed of an original IP packet header and an original IP packet payload. In the IPsec packet, the IPsec header and the IPsec trailer are added to the IP packet, and the IP packet and a part of the IPsec trailer are encrypted. When the packet is encapsulated, an encapsulated IP packet header is added to the IPsec packet as an encapsulated IP packet payload. Further, a MAC address is added before the encapsulated IP packet header.

In the second embodiment, the processes from when a packet is received by the packet switching apparatus to when an IP flow is temporarily registered on the IP flow table 17 and then the packet is handed over to the microprocessor 11 for the routing process are same as the usual processes shown in FIG. 4 (see the steps 301 to 305, 310 and 311).

Referring to FIG. 6A, the microprocessor 11 starts the routing process in response to an interrupt from the packet processing section 14. First, the microprocessor accesses the packet memory 15 through the processor bus 13 and the packet processing section 14 (Step 501). The microprocessor 11 copies only the header section of the packet stored in the processor processing queue of the packet memory 15 into the main memory 12 (Step 502).

Next, the microprocessor 11 identifies an IP destination address of the copied packet header section (Step 503). The microprocessor 11 recognizes the packet as an IPsec decryption object packet when the packet has the IPsec header shown in FIG. 7 and the IP address is destined to the packet switching apparatus itself. At this time, the microprocessor 11 generates a decrypt instruction (Step 504). Also, if the IP address is not destined to the packet switching apparatus, the microprocessor 11. recognizes the packet as an IPsec encryption object packet. At this time, the microprocessor 11 generates an encrypt instruction (Step 505).

Next, referring to FIG. 6B, the process of IPsec encrypting object packet will be described.

In this case, the microprocessor 11 searches tables for the security process, i.e., a security policy database and a security association database which are previously stored in the main memory 12, using the IP destination address of the packet header section as a key. At this time, the microprocessor 11 determines whether the packet should be encrypted (Step 601). When it is determined to be not necessary to encrypt the IP packet, the following processes are the same as those shown in FIG. 5. That is, the processes such as the process of searching the routing table and the ARP cash table and the process of registering the search result on the IP flow table 17 are carried out (see the steps 403 to 405).

When it is determined to be necessary to encrypt the IP packet, the microprocessor 11 sends out security data to the IP flow table 17 through the search processing section 16. The security data contains the encrypting algorithm and the encryption key obtained through the table searching operation in case of the security process. At the same time, an index (SPI) for identifying the security data, a new IP source address and a new IP destination address of an encapsulated IP packet are sent to the IP flow table 17 through the search processing section 16. In addition, a physical port number specifying the security processing section 19 is sent to the IP flow table 17 through the search processing section 16.

In this way, an IP flow is fully registered in place of the temporarily registered IP flow entry (Step 602). This is because the IP flow is temporarily registered when the packet is received. The above operation is equivalent to the registering operation of the physical output port and the security data on the temporarily registered IP flow of the IP flow table 17 shown in FIG. 3.

When the searching operation of the IP flow table 17 with respect to the packet is carried out by the search processing section 16 based on the search key from the packet processing section 14, the IP flow is already registered on the IP flow table 17. Therefore, the packet processing section 14 determines that the packet is an IPsec encrypting object packet, because the encrypting algorithm is specified. The packet processing section 14 receives the searching operation result, and encapsulates the new IP packet with the new IP destination address and the IP source address specified in the IP flow table 17. After that, the packet processing section 14 transfers the encapsulated packet to the security processing section 19, after adding the security data such as the encrypting algorithm to the encapsulated packet (Step 603).

The security processing section 19 separates the security data from the received packet. Then, the security processing section 19 transfers the packet to the packet processing section 14 again, after the packet is subjected to the IPsec encrypting process in accordance with the obtained security data (Step 604).

The packet processing section 14 does not distinguishes the packet sent out from the security processing section 19 from other packets received from the network interface, and carries out the searching operation of the IP flow table 17, as in the usual packet (Step 605).

Now, the packet is already encapsulated to have the new IP destination address and the IP source address. Therefore, the packet processing section 14 temporarily registers the new IP destination address and the new IP source address of the new IP packet on the IP flow table 17.

After this, the microprocessor 11 carries out the routing process, and the microprocessor 11 sends a searching result to the IP flow table 17 such that the IP flow is fully registered (Step 606). As for the packet, because it is possible to determine that the security process is already carried out, the security process is never carried out again.

The encrypted packet through the above processes is processed in the same manner as the usual packet (see the steps 313 to 315 and the steps 307 to 309 of FIG. 4).

Also, when the packet which has the same search key (the IP source address and the IP destination address) as the encrypted packet is received, the received packet can be subjected to the encrypting process using the security data registered in the IP flow table 17. This is because the IP flow corresponding to the received packet has been already registered on the IP flow table 17. Therefore, the packet processing section 14 generates an encrypt instruction. Also, the packet is sent from the packet processing section 14 to the security processing section 19 such that the encrypting process can be autonomously carried out without acquiring process of the security data by the microprocessor 11. This is similar to the omission of the routing process to the usual packet.

Next, the decrypting process of an IPsec decrypt object packet will be described with reference to FIG. 6C. In this case, the microprocessor 11 extracts an SPI from the IPsec header of the packet, and searches the security association database of the main memory 12 for the security process, using the extracted SPI as a key. Thus, the microprocessor 11 obtains an encrypting system and an encryption key (Step 701).

Next, the microprocessor 11 sends out the searched encrypting algorithm, encryption key and a port number of a physical port for the packet to be outputted, to the IP flow table 17 through the search processing section 16. Thus, the full registration of the IP flow which has been temporarily registered is carried out (Step 702).

When the IP flow table 17 is searched by the search processing section 16 for the IP flow associated with the packet, it is determined that the received packet is an IPsec decrypt object packet. This is because the encrypting algorithm is specified and the IP destination address is destined to the packet switching apparatus. The packet processing section 14 receives the searching result from the searching section 16 and adds the security data such as the encrypting algorithm specified in the IP flow table 17 to the packet. Then, the packet processing section 14 transfers the packet with the security data to the security processing section 19. Also, the packet processing section 14 generates a decrypt instruction (Step 703).

The security processing section 19 separates the security data from the received packet. Then, the security processing section 19 carries out the IPsec decrypting process of the transferred packet in accordance with the separated security data. Also, the security processing section 19 separates the IP packet from the encapsulated packet and transfers the IP packet, i.e., a decapsulated packet to the packet processing section 14 again (Step 704).

The packet processing section 14 does not distinguish the decapsulated packet received from the security processing section 19 from the usual packets received from the external network. Thus, the searching operation of the IP flow table 17 is carried out like the usual packet (Step 705). At this time, the packet is decrypted to have an original IP destination address and an IP source address. Therefore, the packet processing section 14 temporarily registers the new IP flow of the packet on the IP flow table 17.

After this, the microprocessor 11 carries out the routing process to send the processing result to the IP flow table 17 such that the IP flow can be fully registered on the IP flow table 17 (Step 706). In this case, since it is determined that the packet is destined to a host in a subnet connected to the packet switching apparatus itself, the security process is not carried out.

The decrypted packet passed through the above processing is handled in the same manner as the usual packet (see the steps 313 to 315 and steps 307 to 309 of FIG. 4). Also, when a packet having the same search key (the IP source address and the IP destination address) as the decrypt object packet is received hereinafter, the decrypting process of the received packet can be carried out using the registered security data. This is because the corresponding IP flow is fully registered on the IP flow table 17. Therefore, the packet is sent from the packet processing section 14 to the security processing section 19 without the acquiring process of the security data by the microprocessor 11, such that the decrypt process is autonomously carried out, as the omission of the routing process to the usual packet.

The present invention is described above using the preferred embodiments. However, the present invention is not limited to the above embodiments.

For example, in the above mentioned embodiments, the security process is carried out to the IPsec encrypting object packet by the security processing section 19, and then the encrypted packet is sent back to the packet processing section 14. At this time, the encrypted packet is handled as the usual packet by the packet processing section 14. Subsequently, the encrypted packet is transferred to the lower layer processing section 20. However, the following processes may be carried out in place of these processes. That is, the packet processing section 14 encapsulates the IP packet and adds a physical output port to the encapsulated packet in addition to a MAC header and the security data. Then, the packet processing section 14 transfers them to the security processing section 19. The security processing section 19 stores the physical output port and the MAC header accompanied by the packet. Then, the security processing section 19 carries out the IPsec packet encrypting process and then transfers the encrypted packet directly to the lower layer processing section 20 connected with the physical output port without passing through the packet processing section 14. To carry out the above mentioned processes, the processes of the present invention should be modified as follows. That is, in the processing by the microprocessor 11 under the software control, the routing process is carried out based on the IP destination address of the encapsulated IP packet in the usual routing process, and the result of the routing process is registered on the IP flow table 17. Moreover, the above processes of the packet processing section 14 and security processing section 19 are added. By the above mentioned modification of the processes, the further improvement of throughput can be attained, compared with the process of FIG. 6B to the IPsec encrypting object packet.

Also, in the above embodiment, when the microprocessor 11 carries out the routing process to the packet associated with the new IP flow, the header section of the packet is copied from the processor processing queue of the packet memory 15 to the main memory 12. However, the microprocessor 11 may receive an address pointer of the packet memory 15 indicating the header section and carry out the processes. That is, the packet itself is located in the packet memory 15 and the microprocessor 11 directly reads the header section of the packet through the processor bus 13 and the packet processing section 14. By the above mentioned modification, the number of times of packet data transfer is suppressed to the minimum so that the processing speed can be increased.

Moreover, a crossbar switch may be adopted as the switch fabric 18. In the packet data transfer of the above embodiment, a data transfer is carried out between the packet processing section 14 and one of the lower layer processing sections 20 or the security processing section 19. However, as described above, when the packet transfer between the security processing section 19 and the lower layer processing section 20 is carried out, the frequency of data conflict is less in the crossbar switch so that the whole throughput can be improved.

As described above, according to the packet switching apparatus of the present invention, the routing process by the microprocessor under the software control is not carried out to the packet having the same IP source address and IP destination address as those of the packet which has been subjected to the routing process by the microprocessor once. Therefore, the packet switching process can be carried out quickly. Thus, the IP packet can be transferred at high speed.

Also, the encrypting process and the decrypting process of the packet can be carried out in a hardware manner without using any process of the microprocessor. Therefore, the security process can be carried out at high speed.

Also, a packet transfer is realized without the routing process by the microprocessor, by using the IP flow table. By combining with the hardware for carrying out the security process, the packet switching accompanied by the security process in the network layer can be carried out at very high speed, compared with the conventional packet switching apparatus.

Moreover, the hardware for carrying out the security process is formed as one component of the switch fabric. Therefore, the independence of the security process can be improved. Thus, the addition of the security process to the packet switching apparatus and the addition or change of the encrypting system become easy. Therefore, the flexibility and the extendibility of the packet switching apparatus can be improved.

What is claimed is:

1. A packet switching apparatus comprising:
 a plurality of lower layer processing units which are connected to physical output ports, and each of which carries out a process for a data link layer and a physical layer for a packet;
 a table storing flow data including a routing data and a search key; and
 a processing unit that searches said flow data from said table based on a routing packet search key received via one of said plurality of lower layer processing units when said flow data for said search key of said routing packet is registered on said table, and selectively transfers said routing packet to one of said plurality of lower layer processing units based on said routing data of said searched flow data wherein the transfer occurs without a microprocessor routing process.

2. A packet switching apparatus according to claim 1, further comprising a packet memory, and
 wherein said processing unit stores said received packet in said packet memory, and extracts said search key from said stored packet.

3. A packet switching apparatus according to claim 1, wherein said routing data includes a port number specifying a physical output port, and
 wherein said processing unit selects one of said plurality of lower layer processing units based on said port number of said routing data of said flow data for said search key of said routing packet, and transfers said routing packet to said selected lower layer processing section.

4. A packet switching apparatus comprising:
 a plurality of lower layer processing units which are connected to physical output ports, and each of which carries out a process for a data link layer and a physical layer for a packet;
 a table storing flow data including a routing data and a search key; and
 a processing unit that searches said flow data from said table based on a search key of a routing packet search key received via one of said plurality of lower layer processing units when said flow data for said search key of said routing packet is registered on said table, and selectively transfers said routing packet to one of said plurality of lower layer processing units based on said routing data of said searched flow data, further comprising a processor carrying out a routing process of said routing packet in response to a routing process request to output said routing data, and
 wherein said processing unit generates said routing process request to said processor, when said flow data for said search key of said routing packet is not registered on said table, and registers said routing data as a part of said flow data for said search key on said table such that said flow data is fully registered, when said routing data is outputted from said processor.

5. A packet switching apparatus according to claim 4, wherein said processing unit stores said search key of said routing packet in said table, when said flow data for said search key of said routing packet is not registered on said table.

6. A packet switching apparatus comprising:
 a plurality of lower layer processing units which are connected to physical output ports, and each of which carries out a process for a data link layer and a physical layer for a packet;
 a table storing flow data including a routing data and a search key; and
 a processing unit that searches said flow data from said table based on a search key of a routing packet search key received via one of said plurality of lower layer processing units when said flow data for said search key of said routing packet is registered on said table, and selectively transfers said routing packet to one of said plurality of lower layer processing units based on said routing data of said searched flow data, wherein said routing data includes a port number specifying a physical output port, and
 wherein said packet switching apparatus further comprises a switch fabric connecting between said processing unit and said plurality of lower layer processing units, having an arbitration function and addressing said routing packet to said lower layer processing unit based on said port number.

7. A packet switching apparatus comprising:
a plurality of lower layer processing units which are connected to physical output ports, and each of which carries out a process for a data link layer and a physical layer to a packet;
a security unit carrying out encrypting and decrypting processes to a first packet based on a specific security data in response to encrypt and decrypt instructions to produce a second packet, respectively;
a table storing flow data including a search key, routing data and security data; and
a processing unit which searches a flow data from said table based on a search key of a routing packet received via one of said plurality of lower layer processing units in a packet memory, when said flow data for said search key of said routing packet is registered on said table and said flow data includes said security data, said search key including a destination address, transfers said security data of said searched flow data as said specific security data, said routing packet as said first packet, and one of said encrypt and decrypt instructions to said security unit, searches another flow data from said table based on a search key of said second packet from said security unit as a routing packet, when said another flow data is registered on said table, and selectively transfers said second packet to one of said plurality of lower layer processing units based on said routing data of said searched another flow data.

8. A packet switching apparatus according to claim 7, wherein said processing unit generates one of said encrypt and decrypt instructions based on said destination address, when said flow data for said search key of said routing packet is registered on said table and said flow data includes said security data.

9. A packet switching apparatus according to claim 7, wherein when said flow data for said search key of said routing packet received via said lower layer processing unit is registered on said table and said flow data does not includes said security data, said processing unit handles said received routing packet as said second packet to search another flow data from said table based on a search key of said second packet.

10. A packet switching apparatus according to claim 7, further comprising a processor carrying out a security process for said routing packet in response to a security process request to output said security data for said routing packet, and
wherein said processing unit selectively generates said security process request to said processor based on said destination address, when said flow data for said search key of said routing packet is not registered on said table, and registers said security data as a part of said flow data for said search key of said routing packet on said table such that said flow data is fully registered, when said security data is outputted from said processor.

11. A packet switching apparatus according to claim 10, wherein said processing unit stores said search key of said routing packet in said table, when said flow data for said search key of said routing packet is not registered on said table.

12. A packet switching apparatus according to claim 7, further comprising a processor carrying out a routing process of said routing packet in response to a routing process request to output said routing data, and wherein said processing unit generates said routing process request to said processor, when said flow data for said search key of said routing packet is not registered on said table, and registers said routing data as a part of said flow data for said search key on said table such that said flow data is fully registered, when said routing data is outputted from said processor.

13. A packet switching apparatus according to claim 12, wherein said processing unit stores said search key of said routing packet in said table, when said flow data for said search key of said routing packet is not registered on said table.

14. A packet switching apparatus according to claim 7, wherein said routing data includes a port number specifying a physical output port, and
wherein said processing unit selects one of said plurality of lower layer processing units based on said port number of said routing data of said flow data for said search key of said routing packet, and transfers said second packet said selected lower layer processing section.

15. A packet switching apparatus according to claim 7, wherein said routing data includes a port number specifying a physical output port, and
wherein said packet switching apparatus further comprises a switch fabric connecting between said processing unit, said security unit and said plurality of lower layer processing units, having an arbitration function and addressing said second packet to said lower layer processing unit based on said port number.

16. A packet switching apparatus comprising:
a plurality of lower layer processing units which are connected to physical output ports, and each of which carries out a process for a data link layer and a physical layer to a packet;
a security unit carrying out encrypting and decrypting processes to a first packet based on a specific security data in response to encrypt and decrypt instructions to produce a second packet, respectively, and selectively transfers said second packet to one of said plurality of lower layer processing units based on routing data;
a table storing flow data including a search key, routing data and security data; and
a processing unit which searches a flow data from said table based on a search key of a routing packet received via one of said plurality of lower layer processing units in said packet memory, when said flow data for said search key of said routing packet is registered on said table and said flow data includes said security data, said search key including a destination address, transfers said security data of said searched flow data as said specific security data, said routing packet as said first packet, and one of said encrypt and decrypt instructions to said security unit together with said routing data.

17. A packet switching apparatus according to claim 16, wherein said processing unit generates one of said encrypt and decrypt instructions based on said destination address, when said flow data for said search key of said routing packet is registered on said table and said flow data includes said security data.

18. A packet switching apparatus according to claim 16, wherein when said flow data for said search key of said routing packet received via said lower layer processing unit is registered on said table and said flow data does not includes said security data, said processing unit selectively transfers said second packet to one of said plurality of lower layer processing units based on said routing data of said searched flow data.

19. A packet switching apparatus according to claim 16, further comprising a processor carrying out a routing process of said routing packet in response to a process request to output said routing data, and selectively carrying out a security process for said routing packet based on said destination address of said routing packet in response to said process request to output said security data for said routing packet, and wherein said processing unit generates said process request to said processor, when said flow data for said search key of said routing packet is not registered on said table, and registers said routing data and said security data from said processor as a part of said flow data for said search key of said routing packet on said table such that said flow data is fully registered.

20. A packet switching apparatus according to claim 19, wherein said processing unit stores said search key of said routing packet in said table, when said flow data for said search key of said routing packet is not registered on said table.

21. A packet switching apparatus according to claim 19, wherein when said flow data for said search key of said routing packet is not registered on said table, said processing unit outputs said routing data and said security data as said specific security data from said processor, said routing packet as said first packet, and one of said encrypt and decrypt instructions to said security unit.

22. A packet switching apparatus according to claim 16, wherein said routing data includes a port number specifying a physical output port, and wherein said security unit selects one of said plurality of lower layer processing units based on said port number of said routing data of said flow data for said search key of said routing packet, and transfers said transmission packet said selected lower layer processing section.

23. A packet switching apparatus according to claim 16, wherein said routing data includes a port number specifying a physical output port, and wherein said packet switching apparatus further comprises a switch fabric connecting between said processing unit, said security unit and said plurality of lower layer processing units, having an arbitration function and addressing said second packet to said lower layer processing unit based on said port number.

24. A method of switching a routing packet comprising:

searching a table for a flow data based on a search key of a routing packet, said flow data including a routing data and said search key; and transferring said routing packet to a physical output port determined based on a destination address of said routing packet when said flow data for said search key of said routing packet is registered on said table without a microprocessor routing process.

25. A method of switching a routing packet comprising:

searching a table for a flow data based on a search key of a routing packet, said flow data including a routing data and said search key; and transferring said routing packet to a physical output port determined based on a destination address of said routing packet when said flow data for said search key of said routing packet is registered on said table, further comprising:

registering said search key on said table when said flow data for said search key of said routing packet is not registered on said table;

carrying out said routing process of said routing packet, when said flow data for said search key of said routing packet is not registered on said table; and registering said routing data as a part of said flow data for said search key on said table such that said flow data is fully registered.

26. A method of switching a routing packet comprising:

searching a table for a flow data based on a search key of a routing packet, said flow data including said search key, routing data and security data, and said search key including a destination address;

selectively generating one of an encrypt and decrypt instruction based on said destination address;

carrying out one of an encrypting process or a decrypting processes to said routing packet based on said security data in response to said generated instruction, when said flow data for said search key of said routing packet is registered on said table and said flow data includes said security data, to produce another routing packet;

outputting said another routing packet as a transmission packet to a physical output port.

27. A method according to clam 26, further comprising:

outputting said transmission packet to a physical output port based on said searched routing data.

28. A method according to claim 26, further comprising:

searching said table for a flow data based on a search key of said transmission packet; and transferring said transmission packet to a physical output port determined based on a destination address of said transmission packet when said flow data for said search key of said routing packet is registered on said table.

29. A method according to claim 26, further comprising:

when said flow data for said search key of said routing packet is registered on said table and said flow data does not includes said security data, selectively transferring said transmission packet to said physical output port based on said routing data of said searched flow data.

30. A method according to claim 26, further comprising:

generating a process request, when said flow data for said search key of said routing packet is not registered on said table;

carrying out a routing process of said routing packet in response to said process request to output said routing data:

selectively carrying out a security process for said routing packet based on said destination address of said routing packet in response to said process request to output said security data for said routing packet; and registering said routing data and said security data as a part of said flow data for said search key of said routing packet such that said flow data is fully registered.

31. A method according to claim 30, wherein said registering includes:

registering said search key of said routing packet in said table, when said flow data for said search key of said routing packet is not registered on said table.

* * * * *